Sept. 17, 1935.  T. GRAM  2,014,764
DRYING PEAT AND OTHER MATERIALS
Filed Aug. 26, 1933
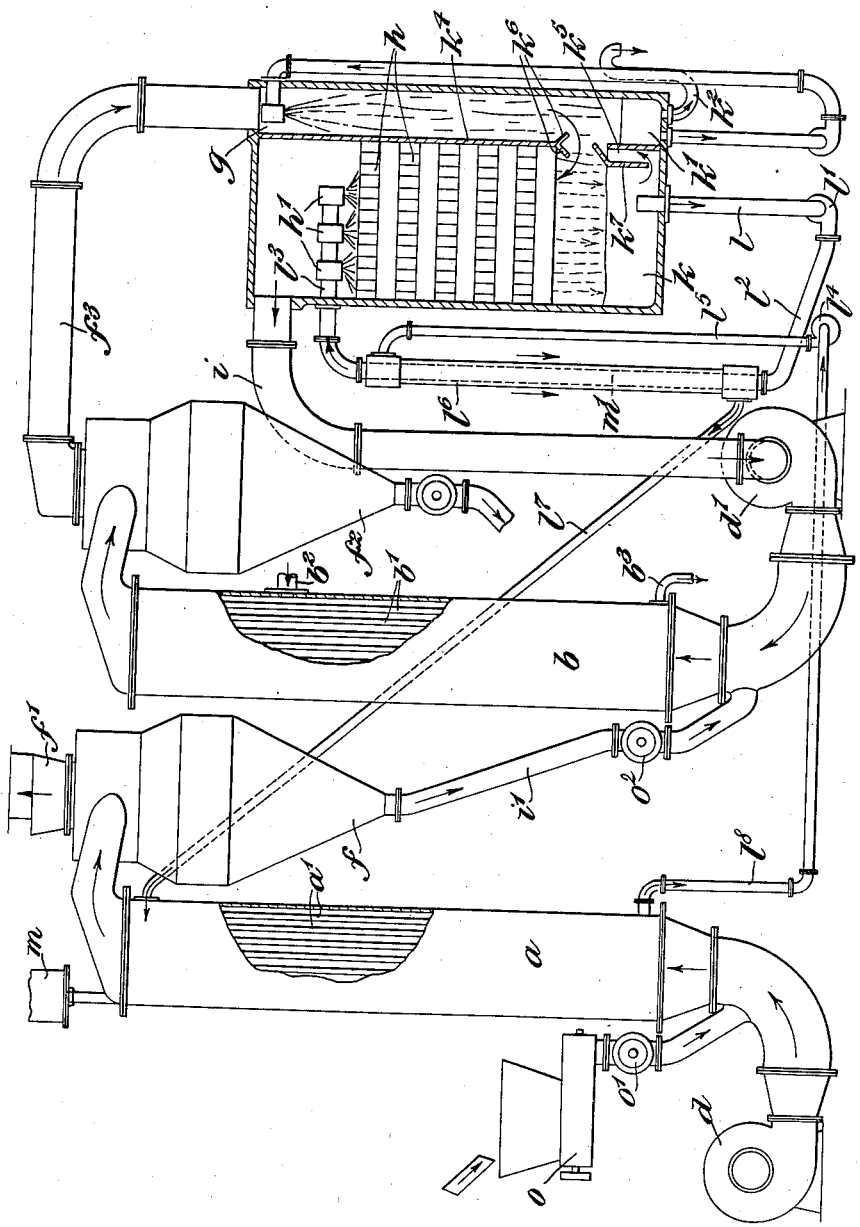

UNITED STATES PATENT OFFICE 2,014,764

DRYING PEAT AND OTHER MATERIALS

Thomas Gram, London, England, assignor to Techno-Chemical Laboratories, Limited, London, England Application August 26, 1933, Serial No. 686,996
In Great Britain September 2, 1932

3 Claims. (Cl. 34—24)

This invention relates to drying processes and apparatus wherein the material to be dried is moved in intimate contact with heated partition surfaces in the presence of, e. g. while being carried in suspension by, a gaseous medium such as air. It is more particularly concerned with processes of the above kind in which heat recovered from the vapours of drying in a higher temperature stage is re-utilized for drying in a lower temperature stage, such as for instance as are described in British patent specification No. 294,289 or United States patent specification No. 1,755,373.

According to a known process of drying, the vapour-laden gaseous medium from a higher temperature drier, after separation from the partly dried material, is brought into direct contact with a liquid and condenses therein delivering its latent heat to and raising the temperature of the liquid, which is circulated as the heating medium in contact with partitions of a lower temperature drier. It has been found, however, more especially when granular or disintegrated materials are being treated, that corrosion and contamination take place in the lower temperature drier, this being due to fine particles of dust and/or certain vapours escaping the cyclone or other separators and/or the precipitating action of scrubbers which are preferably included, and becoming mixed with said heating liquid and thereby carried on to the partition surfaces.

The general object of the invention is to overcome such disadvantages as the foregoing and to render the re-utilization of heat in the kind of process referred to a more satisfactory and economical proposition than hitherto.

The invention consists in a drying method of the kind referred to wherein drying at lower temperatures is obtained by heat recovered from vapours of a higher temperature drying through the intermediary of a body of liquid in indirect heat exchange relation with liquid in which latent heat is recovered from such vapours.

The invention also consists in a method of drying more especially granular material while carried by gaseous media in close relationship to heat-transmitting partition surfaces, and employing heat more than once for drying, by imparting the latent heat of the vapours evolved in one drying stage to a circulating liquid, and utilizing such heat in another drying stage operating at a lower temperature, according to which said circulating liquid is brought into heat exchange relation through partition surfaces capable of withstanding the corrosive action of the liquid, with another quantity of liquid circulated for heating the partition surfaces of the lower temperature drier.

The invention further consists in a method of drying according to either of the two preceding paragraphs wherein heat transfer between the two liquids is effected with low temperature differences, e. g. of the order of about 2 to 5 centigrade degrees.

The invention further consists in a method of drying in which the heat of vapours evolved in one drying unit is utilized for heating another drying unit working at a lower temperature in two stages, viz. by the transfer of heat with small temperature difference from the vapours, as far as practicable free from dust and the like, to a circulating liquid through direct contact over substantial superficial areas, which are wetted by the liquid, the vapours being cooled and part of them being condensed in the liquid, and by the transfer of heat with small temperature differences from said liquid to another circulating liquid by means of heat-transmitting partition surfaces, the latter liquid being used as heating medium for the lower temperature drier.

The invention further consists in apparatus for drying in accordance with any of the four preceding paragraphs comprising means for transferring heat without direct contact from a liquid, which has been in contact with vapours from one drying unit, to another liquid which is used as heating medium in another drying unit.

The invention further consists in drying methods and apparatus therefor, substantially as indicated.

The accompanying drawing shows more or less diagrammatically an elevation of one convenient form of apparatus in which the present invention can be carried into effect.

In carrying the invention into effect in one convenient form as applied by way of example to the drying say of peat, the apparatus used comprises a two-stage or double-effect drier constructed and operating substantially in accordance with British patent specification No. 294,289, with such additions and modifications as will be apparent from what follows herein.

When operating according to the invention in apparatus as shown in the drawing the peat or the like, introduced by a suitable feeding device $o$, $o_1$ is suspended in air or a mixture of air and vapour delivered by a fan $d$ and passed thereby through the tubes $a_1$ or other heated surfaces of the drier $a$ and thence through a cyclone separator $f$ where the dry or partly dried peat is separated from the vapours and discharged through the conduit $i_1$. The peat in this way passes through the lower temperature effect and via the feeding device $o_2$ also through the higher temperature effect $b$ in series.

The air for the lower temperature effect drier $a$ is taken in by the fan $d$ from the atmosphere and after being separated from the peat in the cyclone $f$ associated with the outlet from the lower temperature effect drier $a$ is discharged at $f_1$ from the cyclone separator into the atmosphere.

The air and/or vapour employed in the higher temperature effect $b$, however, is circulated in a closed cycle by a fan $d_1$ whence it passes through the higher temperature effect drier and its associated cyclone separator $f_2$ and via the conduit $f_3$ into a suitable form of scrubber $g$ in which the greater part of the dust content retained after the cyclone separation is precipitated. After passing through the scrubber and thus substantially purified, the air and vapour mixture is passed through a device $h$, or, as it will be called, the direct heat exchanger, in which it comes into direct and intimate contact with sprays $h_1$ of water or other liquid which it heats (and which in the ordinary way hitherto has been used directly for the heating of the tubes or other heat-transmitting partitions of the lower temperature drier). The air and vapour is then returned from the direct heat exchanger via the conduit $i$ to the fan $d_1$ for recirculation through the higher temperature drier $b$ conveniently as shown with partly dried peat or the like admitted via the conduit $i_1$ from the cyclone separator $f$ associated with the lower temperature drier $a$.

The body of water heated as above in the direct heat exchanger is circulated from the reservoir $k$ by suitable pump means $l_1$ and pipes $l$, $l_2$, $l_3$ through the inside tube $m_1$ of a tubular heat exchanger $m$, from which it returns to the sprays $h_1$ of the direct heat exchanger $h$. A constant quantity of clean water or other suitable liquid is delivered as by a pump $l_4$ and a pipe system $l_5$, $l_7$ and $l_8$ so as to pass through the annulus $l_6$ between the concentric tubes of the system forming the tubular heat exchanger $m$, and after being thereby heated is passed on to the tubes $a_1$ of the lower temperature drier $a$ for heating the partition surfaces thereof and effecting the drying therein. From the bottom of the lower temperature drier $a$ the water returns to the pump $l_4$ for recirculation through the tubular heater as before. A surge tank $m$ conveniently connected to the lower temperature drier serves to keep the system full at varying temperatures.

The higher temperature drier $b$ is, as already known, heated by steam which surrounds its tubes $b_1$ the steam being admitted say at $b_2$ and the condensate formed returning from the outlet $b_3$ to the boiler system. The water evaporated from the peat or the like in the higher temperature effect is wholly condensed while heating the circulating water employed in the direct heat exchanger $h$. The surplus of water and condensate from this system passes over from the reservoir $k$ into the reservoir $k_1$ of the scrubber system and mixes with the water circulating therein by such means as that shown, any excess water in this case being passed to waste from the overflow pipe $k_2$.

In a unit construction of heat exchanger and scrubber such as is shown in the drawing the direct heat exchanger and scrubber compartments as well as their respective reservoirs or tanks $k$ and $k_1$ may be defined by vertically aligned partitions $k_4$ and $k_5$, diverting plates such as $k_6$ keeping separate the sprays in the two compartments. Preferably also the overflow from $k$ to $k_1$ takes place under baffle means such as $k_7$ and the pipe $l$ opens into the reservoir $k$ some distance clear of the bottom of the latter to be clear of any sludge or sediment such as may accumulate therein due to partial ineffectiveness of the scrubber.

When the invention is incorporated in large drying systems, the indirect or tubular heat exchanger described above is preferably made in several units connected in parallel with one another; e. g. one such heat exchanger being provided for each spray pipe included in the direct heat exchanger.

The employment of the foregoing provisions renders the driers quite immune from any corrosive action of dust carried away by the vapours from the drier or any corrosive vapours evolved through the drying of the material, the said provisions in effect confining the body of liquid whence such corrosion and pollution arise to a small part only of the whole apparatus. It will be understood therefore that such part, viz. the tubular heat exchanger, and preferably all connections and pumping means associated therewith, should be and may be without undue expense constructed of or lined with a suitable anticorrosive material. Copper containing arsenic may advantageously be employed for this purpose. It is desirable also that the scrubber system should be adapted to resist corrosion.

In some cases if desired the indirect heat exchanger means can be designed for a high rate of heat transmission by the employment of a fairly high velocity of flow of the water through the inside tube and in the annular space respectively. In this way the temperature gradient in this heat exchanger can as desirable be kept small, say at from 2° to 5° C.

It is to be understood that modifications and additions may be introduced without departure from the scope of this invention as defined in the claims, the specific description having been given by way of example only and other constructions or arrangements of apparatus being possible.

I claim:

1. In drying moist materials in stages in a gaseous medium with which it is passed across heated drying surfaces including some forming a stage operating at a low temperature and heated by a liquid deriving heat from vapours of drying produced by others of said surfaces constituting a higher temperature stage, the method which comprises circulating the said liquid in contact with further heat-transmitting surfaces and heating these latter by contact with a further body of liquid containing the condensate and latent heat of said vapours.

2. In heating surfaces of a drying conduit across which surfaces material is carried in suspension for drying by a gaseous medium, the method of heating a body of liquid and using it for heating such drying surfaces, which method consists in circulating said liquid in a closed circuit between said drying surfaces and heat-transmitting surface separating the said liquid from a further body of liquid, and circulating the latter in a circuit in which it is brought in turn into heating relation with said heat-transmitting surface and into direct condensive and mixing relationship with vapours evolved by the drying of such material.

3. In the stage-wise drying of materials in a gaseous carrier medium moved across heated drying surfaces and after separation of the two recovering the latent heat of vapours evolved in a higher temperature stage and utilizing such heat for heating the drying surfaces of a lower temperature stage, conveying such heat from a liquid containing the vapour condensate to said surfaces of said lower temperature stage through the intermediary of a body of liquid circulated in heat exchange relationship but out of direct contact with the first-mentioned liquid, and effecting such heat exchange at temperature differences of the order of 2 to 5 centigrade degrees.

THOMAS GRAM.